United States Patent
Skjolsvold et al.

(10) Patent No.: US 9,286,001 B2
(45) Date of Patent: Mar. 15, 2016

(54) EFFECTIVE RANGE PARTITION SPLITTING IN SCALABLE STORAGE

(71) Applicant: MICROSOFT CORPORATION, Redmond, WA (US)

(72) Inventors: Arild Skjolsvold, Kenmore, WA (US); Ju Wang, Redmond, WA (US); Bradley Gene Calder, Bellevue, WA (US)

(73) Assignee: MICROSOFT LICENSING TECHNOLOGY LLC, Redmond, WA (US)

( * ) Notice: Subject to any disclaimer, the term of this patent is extended or adjusted under 35 U.S.C. 154(b) by 44 days.

(21) Appl. No.: 14/319,758

(22) Filed: Jun. 30, 2014

(65) Prior Publication Data

US 2015/0378635 A1 Dec. 31, 2015

(51) Int. Cl.
- G06F 12/08 (2006.01)
- G06F 3/06 (2006.01)
- G06F 9/50 (2006.01)
- G06F 5/06 (2006.01)

(52) U.S. Cl.
CPC ............ *G06F 3/0626* (2013.01); *G06F 3/0644* (2013.01); *G06F 3/0658* (2013.01); *G06F 3/0689* (2013.01); *G06F 5/065* (2013.01); *G06F 9/5061* (2013.01); *G06F 9/5077* (2013.01)

(58) Field of Classification Search
None
See application file for complete search history.

(56) References Cited

U.S. PATENT DOCUMENTS

| 8,140,585 B2 | 3/2012 | Chen et al. |
| 2010/0106934 A1 | 4/2010 | Calder et al. |
| 2012/0137018 A1 | 5/2012 | Uhlig et al. |
| 2012/0303791 A1 | 11/2012 | Calder et al. |
| 2013/0110819 A1 | 5/2013 | Attaluri et al. |
| 2013/0204991 A1 | 8/2013 | Skjolsvold et al. |
| 2013/0311426 A1 | 11/2013 | Erdogan et al. |
| 2014/0129715 A1 | 5/2014 | Mortazavi |

FOREIGN PATENT DOCUMENTS

WO 2013032909 A1 3/2013

OTHER PUBLICATIONS

"Designing a Scalable Partitioning Strategy for Windows Azure Table Storage," published Oct. 5, 2011, http://msdn.microsoft.com/en-us/library/hh508997.aspx, 10 pages.

(Continued)

*Primary Examiner* — Duc Doan
(74) *Attorney, Agent, or Firm* — Ben Tabor; Kate Drakos; Micky Minhas

(57) ABSTRACT

A method for load balancing includes determining a reference key within a partition key range of a partition of scalable storage, the partition key range being divided into buckets that have boundaries defining sub ranges of the partition key range. The reference key is determined based on traffic values that correspond to tracked traffic within the buckets. The traffic values are updated based on additional traffic within the buckets and the boundaries are adjusted based on the updated traffic values. A reference key speed is determined that corresponds to a rate of change of a distribution of the tracked traffic with respect to the reference key. Reference key drop-off time may be determined for reference keys. Reference keys can be utilized to determine where to split the partition and reference key speed and reference key drop-off time can be utilized to determine whether or not to split the partition.

20 Claims, 8 Drawing Sheets

(56) References Cited

OTHER PUBLICATIONS

Wang, et al., "OpenFlow-Based Server Load Balancing Gone Wild," In Proceedings of the 11th USENIX Conference on Hot Topics in Management of Internet, Cloud, and Enterprise Networks and Services, Mar. 29, 2011, 6 pages.

"International Search Report and Written Opinion Issued in PCT Application No. PCT/US2015/038212", Mailed Date: Sep. 16, 2015, 10 Pages.

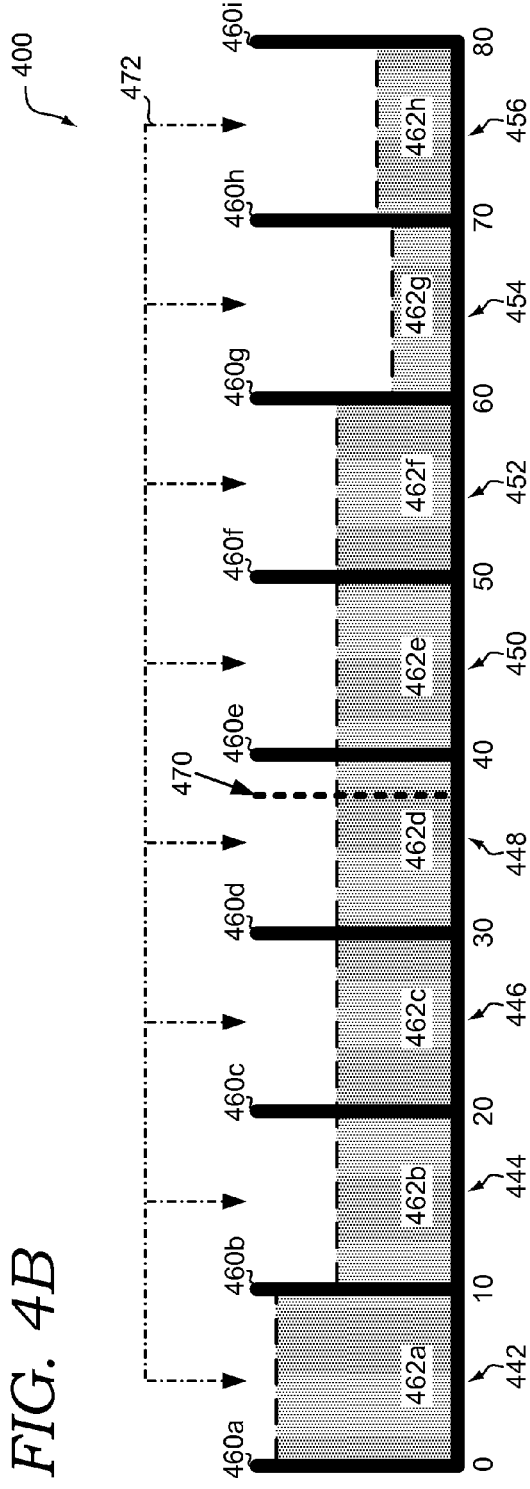
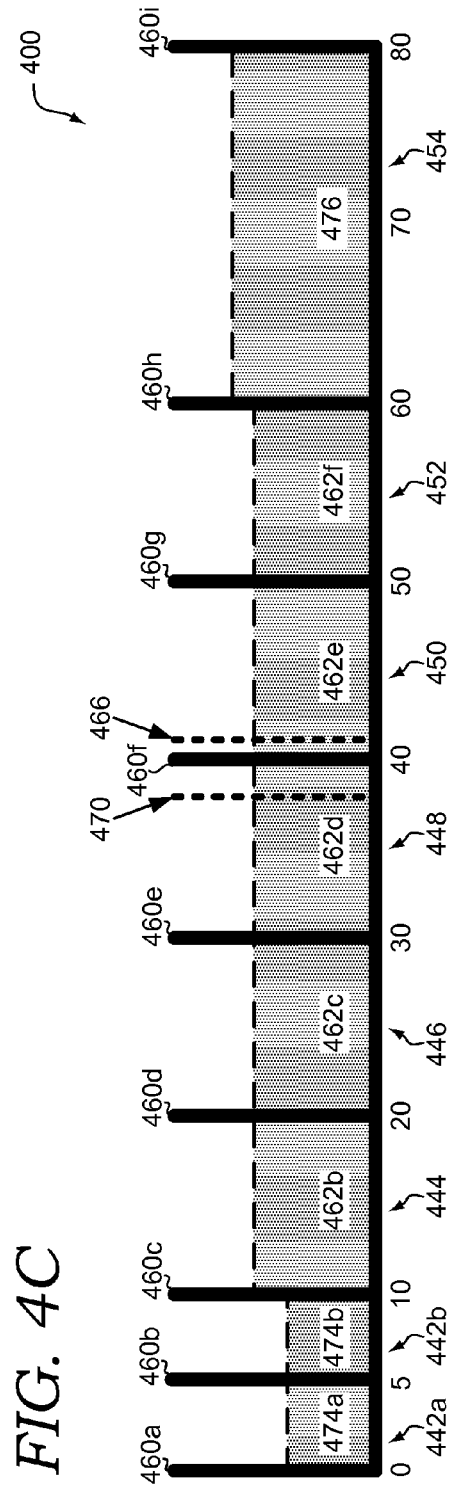

EFFECTIVE RANGE PARTITION SPLITTING IN SCALABLE STORAGE

BACKGROUND

Distributed systems, including server farms, web services, and the like, have become increasingly common to provide resources, such as computational and storage resources. The resources may be provided by a network of servers, which can be part of a structured system to more efficiently store, retrieve, and query over data throughout the network. It may be desirable to distribute workloads across the servers, in order to optimize resource usage, maximize throughput, minimize response time, avoid overload of one of the servers, and/or achieve other load balancing objectives. However, due to the complexity of modem distributed systems, it can be challenging to effectively and efficiently determine load balancing decisions.

SUMMARY

The present disclosure is directed, in part, to effective range partition splitting in scalable storage, substantially as shown in and/or described in connection with at least one of the figures, and as set forth more completely in the claims. In certain aspects of the present disclosure, traffic across a partition key range of a partition is tracked and the partition may be split into multiple partitions or otherwise modified based on the tracked traffic. In particular, the tracked traffic and corresponding workload can be predictive of future traffic and corresponding future workloads, and therefore can form the basis for various load balancing decisions.

In some respects, the present disclosure relates to determining one or more reference keys based on tracked traffic across a partition key range. A reference key divides the tracked traffic across the partition key range and can optionally correspond to a split-point whereby a partition may be split into multiple partitions based on the reference key. For example, the partition may be split at or substantially at a reference key.

The traffic can be tracked utilizing traffic values, where each traffic value may correspond to a portion of traffic within a sub range of the partition key range. Furthermore, the traffic values can be updated based on additional traffic, to the partition key range, to include the additional traffic in the tracked traffic. In this way, the traffic values can track the distribution of the traffic over time. As reference keys may be determined from the traffic values, reference keys can be based on the tracked distribution of the traffic.

In certain respects, the present disclosure relates to determining a reference key speed that can correspond to a rate of change of the tracked traffic (e.g. a distribution of the tracked traffic) with respect to the reference key. The reference key speed can be calculated from any number of reference keys, which may correspond to different tracked traffic distributions and may be derived from a common metric. The reference key speed can form the basis for load balancing decisions, such as whether or not to split or otherwise modify a partition.

The present disclosure further relates to buckets, which have boundaries that define sub ranges of the buckets. The buckets can have corresponding traffic values that quantify portions of tracked traffic that fall within the buckets. The boundaries of the buckets can be adjusted to more evenly distribute the traffic values amongst the buckets. This may comprise merging, splitting, or moving boundaries of the buckets, which redefines the sub ranges of the buckets. Reference keys and reference key speeds can be determined based on the buckets and/or the boundaries.

In some respects, the present disclosure relates to load balancing decisions based on tracked traffic, without requiring extensive and complex tracking, maintenance, and analysis of traffic data. In particular, various combinations of reference keys, reference key speeds, buckets, boundaries, and traffic values can be utilized to effectively and efficiently implement various load balancing decisions.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Implementations of the present disclosure are described in detail below with reference to the attached drawing figures, wherein:

FIG. 4B depicts an exemplary partition key range in accordance with implementations of the present disclosure;

FIG. 4C depicts an exemplary partition key range in accordance with implementations of the present disclosure;

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present disclosure is directed, in part, to load balancing scalable storage. In one respect, partitions that are assigned to servers are implemented in a key space. The partitions can correspond to partition key ranges in which a partition corresponds to a range of partition keys between a low partition key and a high partition key. The partition key ranges can be contiguous as part of the key space. Access requests can be utilized to access data in a partition and can correspond to partition keys in a partition key range of the partition. The access requests impose traffic across the partition key range, which corresponds to a workload that is associated with the partition.

In some respects, load balancing is implemented, at least in part, by splitting a partition that is hosted by a server into multiple partitions. The multiple partitions can be hosted by different servers of the scalable storage such that future traffic and corresponding future workload that would have been imposed solely on the server absent the splitting can instead be distributed amongst the different servers. In this way, the future workload can be balanced amongst the servers of the scalable storage.

In certain aspects of the present disclosure, traffic across a partition key range of a partition is tracked and the partition may be split into multiple partitions based on the tracked traffic. In particular, the tracked traffic and corresponding workload are predictive of future traffic and corresponding future workloads, and therefore can form the basis for determining whether or not to split the partition and/or where to split the partition in a partition key range of a partition.

Figure 1:
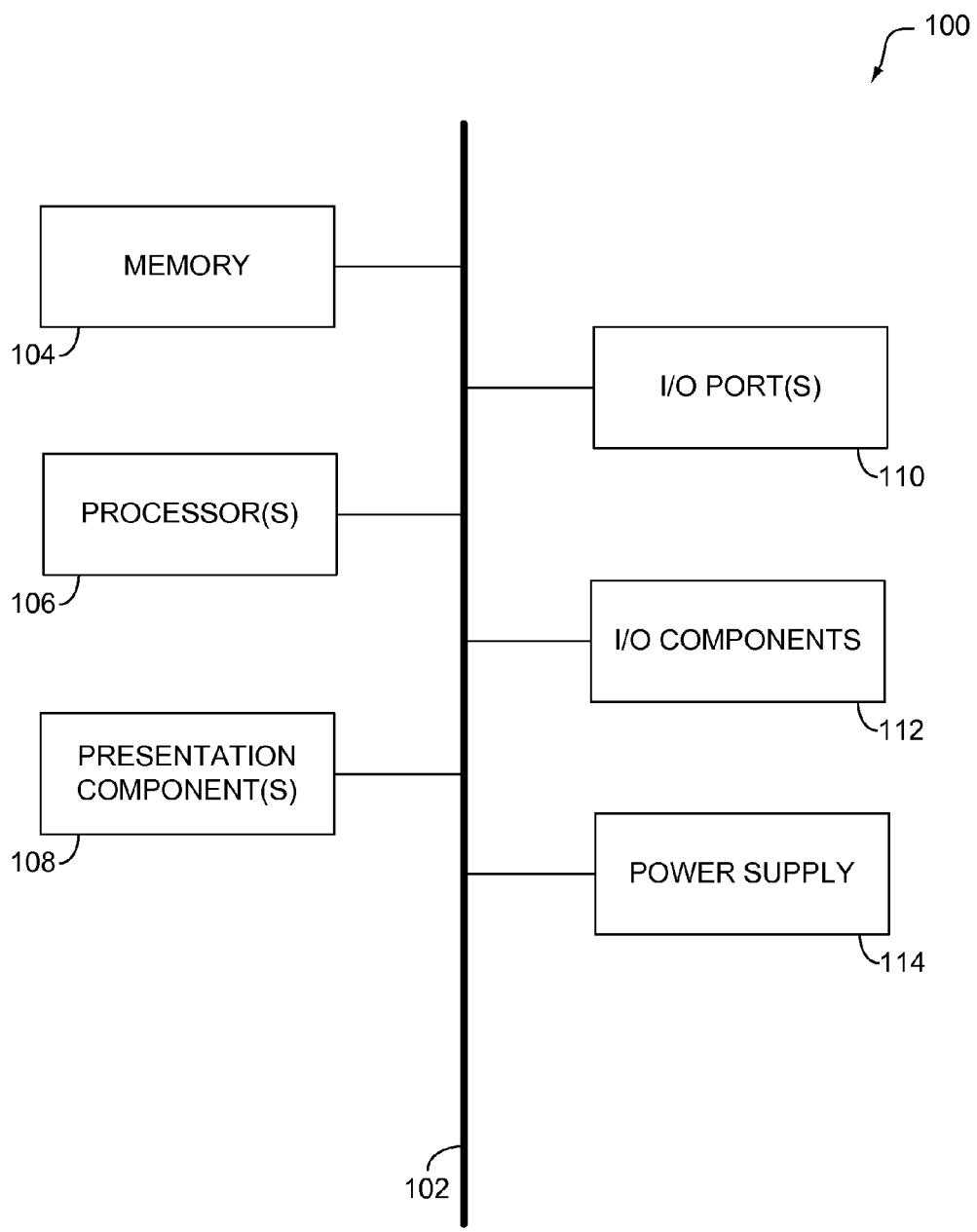
FIG. 1 is a diagram of an exemplary computing environment suitable for use in implementations of the present disclosure.

Referring to FIG. 1, FIG. 1 is a diagram of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Figure 2:
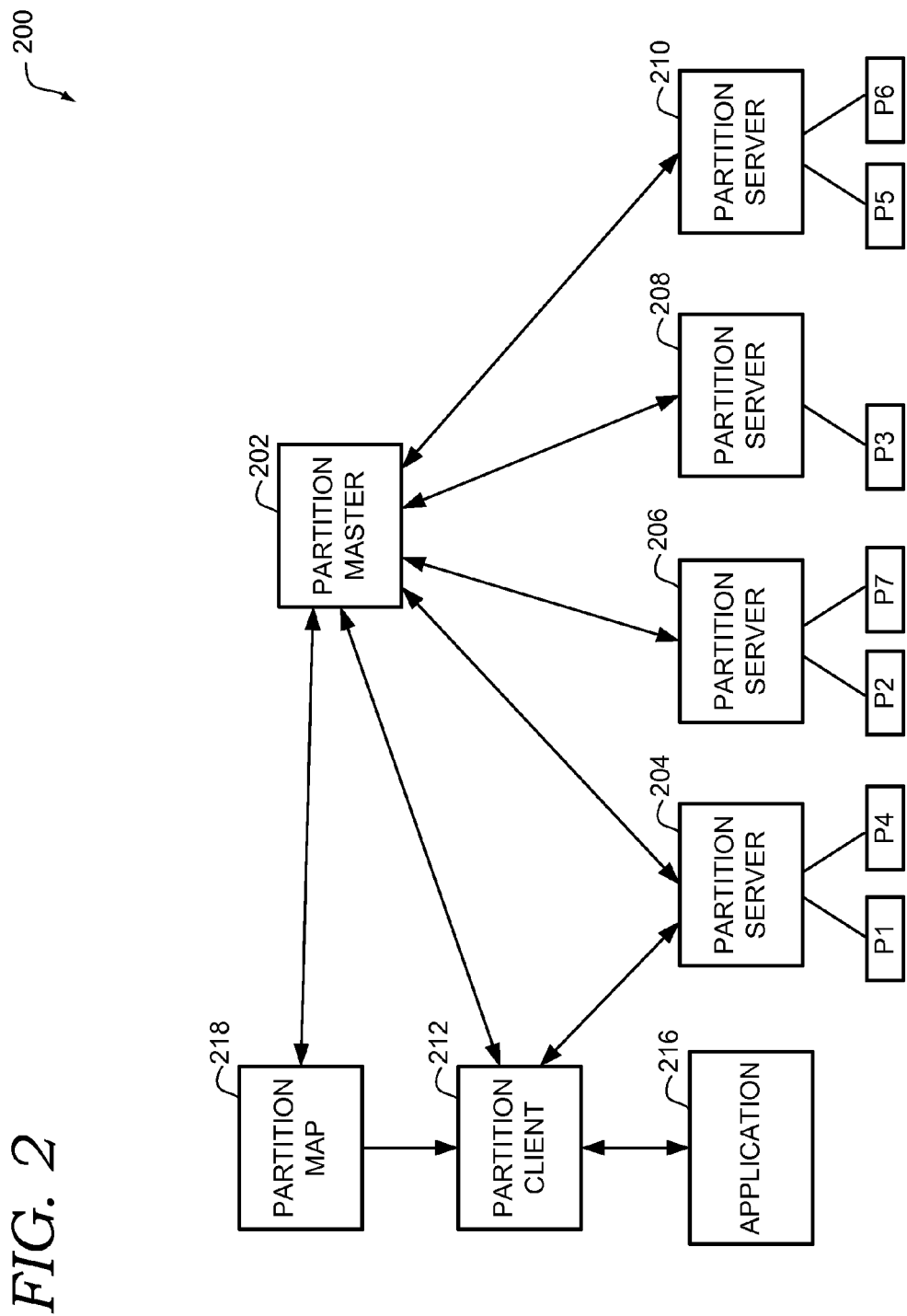
FIG. 2 illustrates an exemplary system in which implementations of the present disclosure may be employed.

Referring now to FIG. 2, FIG. 2 illustrates an exemplary system in which implementations of the present disclosure may be employed. In particular, FIG. 2 shows a high level architecture of scalable storage 200 (also referred to herein as "distributed system 200") in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software.

For instance, various functions may be carried out by a processor executing instructions stored in memory.

Among other components not shown, distributed system 200 includes master 202 (e.g. partition master 202), servers 204, 206, 208, and 210 (e.g. partition servers 204, 206, 208, and 210), and client 212 (e.g. partition client 212). Each may reside on any type of computing device, which may correspond to computing device 100 described with reference to FIG. 1, for example. The components of distributed system 200 may communicate with each other over a network, which may include, without limitation, one or more local area networks (LANs) and/or wide area networks (WANs). Although a single master, four servers, and a single client are shown in FIG. 2, any number of masters, servers, and clients may be employed within distributed system 200 within the scope of implementations of the present disclosure.

In distributed system 200, the servers, such as servers 204, 206, 208, and 210 are utilized to store and provide access to a storage system, for example, a structured storage system. Master 202 is configured to manage the servers. Furthermore, client 212 is configured to provide applications, such as application 216, access to the storage system.

Stored data of scalable storage 200 is divided amongst a plurality of partitions, which may be implemented utilizing range partitioning. Scalable storage 200 can comprise a key space divided amongst the plurality of partitions. Each partition may have a partition key range that corresponds to a sub portion of the key space. Master 202 is configured to assign the partitions to servers 204, 206, 208, and 210, and/or other servers of distributed system 200 not shown. Master 202 can also be configured to determine when a partition of the partitions is not hosted by any server due to a failure and reassign the partition to a different server. Master 202 is further configured to control load balancing of the partitions on servers 204, 206, 208, 210, and/or other servers of distributed system 200 not shown. Additionally, Master 202 is configured to monitor resource utilization with respect to any of the partitions and/or servers 204, 206, 208, and 210, and/or other servers of distributed system 200 not shown.

Each server of distributed system 200, such as servers 204, 206, 208, and 210, can be responsible for providing read and write access to zero to many partitions assigned to the server. Furthermore, each of the partitions can be assigned to a single one of the servers. In the example shown in FIG. 2, server 204 is hosting partitions P1 and P4, server 206 is hosting partitions P2 and P7, server 208 is hosting partition P3, and server 210 is hosting partitions P5 and P6.

Client 212 is linked into an application, such as application 216. In some implementations client 212 is configured to issue commands (e.g. access requests) to some of the partitions (e.g. partitions P1, P2, P3, P4, P5, P6, and P7) hosted by servers 204, 206, 208, and 210 and/or other servers of distributed system 200. Also in some implementations, client 212 may communicate with the application indirectly, for example, through a virtual IP and software load balancer or other means that directs communication requests to a front-end. The front-end can utilize a partition map, such as partition map 218, to determine which of the servers is hosting (mapped to) which of the partitions and can send commands to those servers. Results of the commands can be received back from the servers and can be passed to the application. The partition map stores mappings between the partitions and the servers they are assigned to, and can typically be maintained by a master, such as master 202.

Having described various aspects of distributed system 200, it is noted that any number of components may be employed to achieve the desired functionality within the scope of the present disclosure. Although the various components of FIG. 2 are shown with lines for the sake of clarity, in reality, delineating various components is not so clear, and metaphorically, the lines may more accurately be grey or fuzzy. Further, although some components of FIG. 2 are depicted as single components, the depictions are exemplary in nature and in number and are not to be construed as limiting for all implementations of the present disclosure.

As indicated above, the servers of distributed system 200 are configured to host partitions, thereby providing various resources for the partitions, which can include computational and storage resources. The partitions can, in turn, be associated with workloads of one or more applications, which may be accommodated for by the servers. It may be desirable to adjust the distribution of the workloads across the servers, in order to optimize resource usage, maximize throughput, minimize response time, avoid overload of one of the servers, and/or achieve other load balancing objectives. In order to achieve these and other load balancing objectives, one or more masters, such as master 202 can be configured to execute any of various load balancing operations on the partitions assigned to the servers of distributed system 200. In various implementations, potential load balancing operations are associated with partitions assigned to servers of the scalable storage. Some exemplary load balancing operations are described below. However, the present disclosure is not limited to these load balancing operations.

It is noted that load balancing operations on a partition does not require physical movement of data at the storage level. For example, in various implementations, a partition can be moved to another server by reassigning or remapping a partition range assignment (partition key range) of the partition to a new server (e.g. in a partition map). In particular, the partitions of the scalable storage can each correspond to a partition key range of a key space in a partitioning index for a data object being stored. Exemplary data objects include a blob, a table, and a queue. Assigning partitions to partition servers may not move any data stored by the partitions around. Rather, assigning partitions may inform the servers as to what key range(s) of the index the servers are responsible for.

One type of load balancing operation, which can be executed by master 202 comprises a movement of one of the partitions to a different one of the servers of distributed system 200 (movement operation). For example, assume that server 204 has excessive CPU utilization and server 206 has low CPU utilization. Partition P1 may be moved from server 204 to server 206 so that the CPU utilization attributable to partition P1 can instead be accommodated for by server 206. This can relieve server 204 of the excessive CPU utilization, thereby improving load balancing with respect to CPU utilization. Master 202 may perform a movement, for example, by offloading a partition from one server, assigning the partition to another server, and updating a partition map to reflect that the partition is assigned to the new server.

Another type of load balancing operation, which can be executed by master 202 comprises a merging of ones of the partitions into a shared partition to be assigned to one of the servers of distributed system 200 (merging operation). For example, assume that servers 204 and 206 each have too many partitions. Partitions P1 and P2 may be merged into a single partition assigned to server 204 or server 206. In this way, at least one of servers 204 and 206 can host a reduced number of partitions. Again, merging of partitions does not require physical movement of data at the storage level. Rather, in various implementations, partitions can be merged by updating a partition map to represent the partitions as a single partition, which is assigned to one of the servers.

As another example, a type of load balancing operation, which can be executed by master 202 comprises a splitting of one of the partitions into multiple partitions to be assigned to ones of the servers of distributed system 200 (splitting operation). For example, assume that server 204 has excessive CPU utilization and server 206 has low CPU utilization. Partition P1 may be split into multiple partitions in a load balancing operation. One or both of the multiple partitions may be assigned to a different server than server 204, such as server 206. In this way, the CPU utilization attributable to partition P1 can be accommodated for by multiple ones of the servers thereby reducing the overall CPU utilization on server 204. Again, splitting of a partition does not require physical movement of data at the storage level. Rather, in various implementations, a partition can be split by updating a partition map to represent the partition as multiple partitions, which are assigned to the servers.

Figure 3:
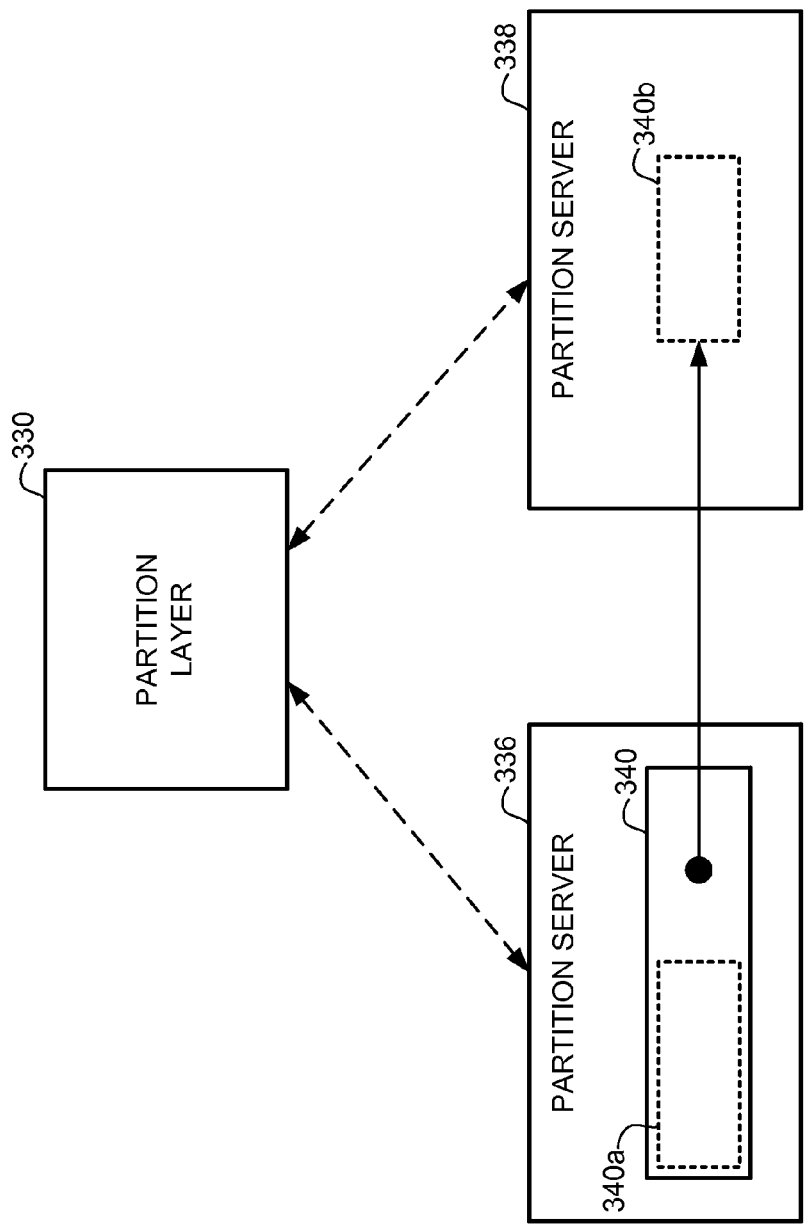
FIG. 3 illustrates exemplary splitting of a partition of scalable storage into multiple partitions in accordance with implementations of the present disclosure.

Turning to FIG. 3, FIG. 3 illustrates exemplary splitting of a partition of scalable storage into multiple partitions in accordance with implementations of the present disclosure. FIG. 3 includes partition layer 330, which can be comprised of partition servers and/or other servers, such as master servers, and can manage data abstractions in a distributed system, such as scalable storage 200 of FIG. 2. Data abstractions can comprise data objects, examples of which include blobs, tables, and queues. Partition layer 330 can also manage a namespace for the data objects and partitioning of the data objects. In the example shown, partition layer 330 is configured to control the assignment of partitions (e.g. any of partitions P1, P2, P3, P4, P5, P6, and P7 in FIG. 2) to servers 336 and 338, which can correspond to any of servers 204, 206, 208, and 210 in FIG. 2.

Partition layer 330 can also govern load balancing to distribute workloads between the servers that correspond to access requests (e.g., read, write, and delete requests) on partitions hosted by the servers. For example, in some implementations, load balancing the servers comprises splitting a partition into multiple partitions, where the multiple partitions are assigned to different servers to thereby distribute the workloads between those servers.

FIG. 3 illustrates partition layer 330 splitting partition 340 into child partitions 340a and 340b that are assigned to servers 336 and 338 respectively. The splitting can comprise dividing a partition key range that corresponds to partition 340 into child partitions 340a and 340b. In the implementation shown, partition 340 is a modified subject partition and child partition 340a corresponds to a diminished partition key range of partition 340. Child partition 340b is newly formed and is placed on server 338 that is distinct from server 336, which hosts child partition 340a. Child partition 340b corresponds to a remainder of the partition key range of partition 340 that is not encompassed by partition 340a. As such, servers 336 and 338 can split a workload that would otherwise be hosted by server 336.

As described above, in certain aspects of the present disclosure, traffic across a partition key range of a partition is tracked and load balancing decisions can be made based on the tracked traffic. For example, the partition may be split into multiple partitions based on the tracked traffic. The tracked traffic and corresponding workload are typically predictive of future traffic and corresponding future workloads, and therefore can form the basis for determining load balancing decisions, such as whether or not to split the partition and/or where to split the partition in a partition key range of the partition. In accordance with implementations of the present disclosure, load balancing decisions can be made effectively and efficiently without imposing significant overhead on the scalable storage.

Figure 4A:
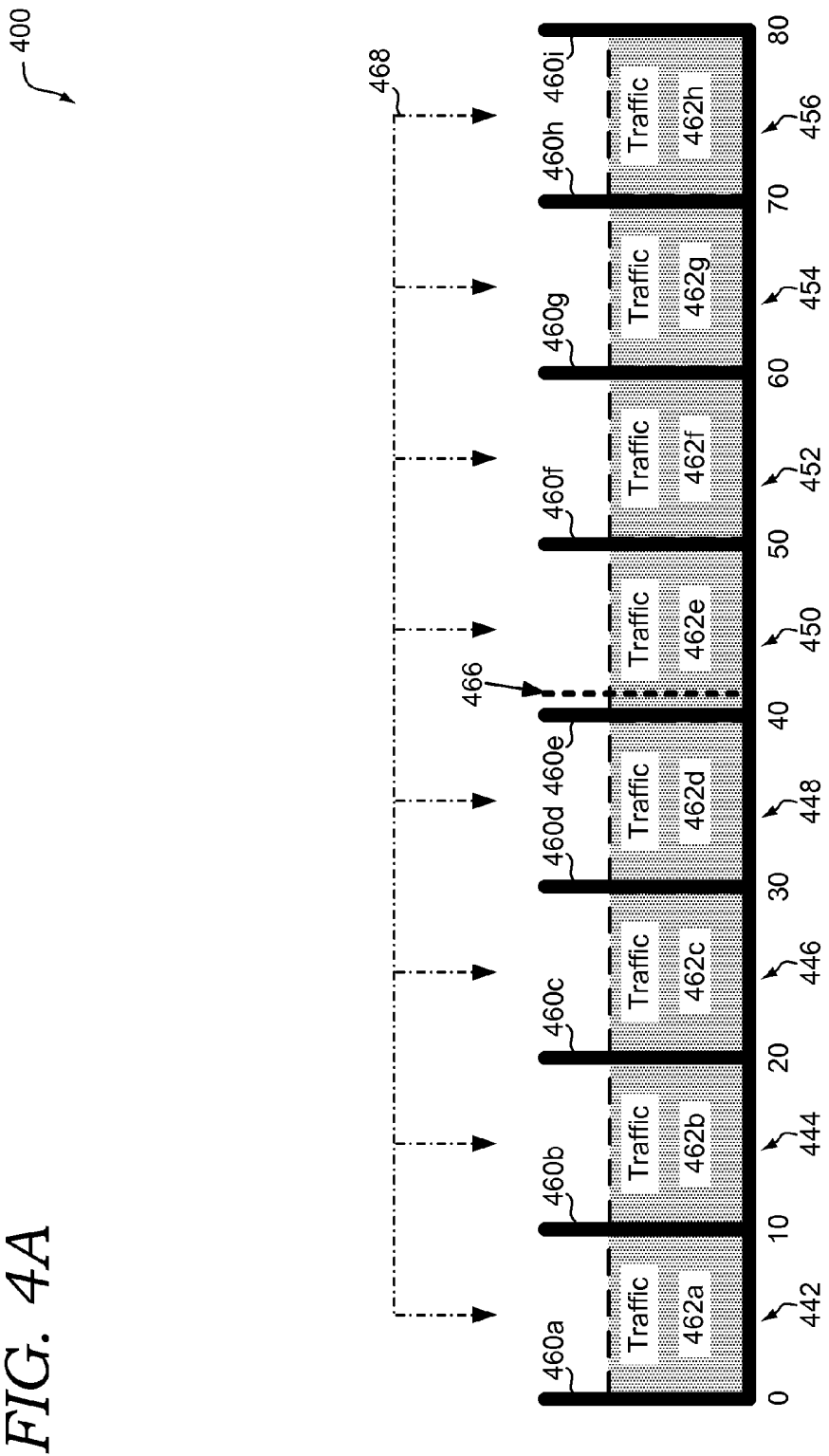
FIG. 4A depicts an exemplary partition key range in accordance with implementations of the present disclosure.

Referring now to FIG. 4A, FIG. 4A depicts an exemplary partition key range in accordance with implementations of the present disclosure. In particular, FIG. 4A depicts partition key range 400, which can correspond to a partition key range of partition 340 in FIG. 3 prior to the splitting of the partition into multiple partitions.

Partition key range 400 comprises a range of partition keys between low partition key 0 and high partition key 80. The partition keys shown can correspond to normalized keys. In particular, the values of partition keys 0, 10, 20, 30, 40, 50, 60, 70, and 80, shown in FIG. 4A, may not be indicative of relative distances between those partition keys. In other words, any number of partition keys may exist or be created between any given pair of those partition keys. For example, 150 partition keys may exist between partition keys 0 and 10, as the partition keys are not necessarily limited to integer values. However, the values of the partition keys are indicative of the relative order of the partition keys across partition key range 400. In particular, each partition key may be arranged in order between partition key 0 and partition key 80.

In accordance with implementations of the present disclosure, traffic is tracked across partition key range 400. Furthermore, scalable storage (e.g. scalable storage 200) can be load balanced based on the tracked traffic. Traffic can comprise access requests that correspond to partition keys of partition key range 400. Over time, access requests may be directed toward various partition keys along partition key range 400. As a result, traffic is distributed along partition key range 400 as any of the various partition keys become the subject of one or more access requests. Partition layer 330 can be configured to track the distribution of the traffic across partition key range 400 over time. The distribution of the traffic can form the basis for load balancing decisions.

Various approaches can be employed in order to track the traffic across partition key range 400. These approaches are not exhaustively described herein. In some implementations, the traffic is tracked utilizing traffic values that correspond to the tracked traffic. Any to all of the traffic values can correspond to a plurality of partition keys. However, in some implementations, at least one of the traffic values can correspond to a single partition key.

Where a traffic value corresponds to a plurality of partition keys, the traffic value can correspond to a sub range of partition key range 400. The traffic values can correspond to portions of the traffic that are within sub ranges of partition key range 400. Different traffic values can correspond to different sub ranges of partition key range 400. When an access request is within a sub range, a corresponding traffic value of the sub range can be determined and/or updated to track the traffic. As the sub ranges can be distributed across partition key range 400, the traffic values can indicate the distribution of tracked traffic across partition key range 400. This can allow for load balancing based on the distribution of tracked traffic without requiring large quantities of data to track the distribution.

In some implementations, any to all of the sub ranges are delineated by boundaries. The boundaries can be reference points for determining which traffic value corresponds to a given access request. In this respect, the boundaries can be reference points for the sub ranges in partition key range 400. A partition key that corresponds to an access request can be compared to the boundaries to determine which traffic value that partition key corresponds to, which may comprise determining which pair of boundaries the partition key is between. For example, where a partition key lies between a first boundary and a second boundary (e.g. adjacent boundaries), the partition key can be determined to fall within a sub range that is between the first and second boundaries. Partition layer 330 may track and store the boundaries and each of the boundaries can correspond to a partition key. Tracking boundaries of the sub ranges can allow for determining which sub range and/or traffic value an access request corresponds to without requiring large quantities of data to delineate the sub ranges.

Traffic values can be based on request rates of access requests on the sub ranges and/or partition keys. For example, a traffic value can be updated in response to an access request being directed toward its corresponding sub range or partition key(s). Updates to the traffic value in response to access requests can be cumulative so as to reflect the rate of the access requests. For example, a traffic value may be updated each time an access request falls within its corresponding sub range of partition key range 400. In some respects, the traffic values can correspond to counters that are incremented in response to access requests. Therefore, without regard to other factors that the traffic values may be based on, over a given period of time, sub ranges that have more access requests directed thereto can have larger traffic values than those with fewer access requests directed thereto, thereby corresponding to a distribution of traffic over the period of time.

Traffic values can also be based on request latency of access requests. For example, a traffic value can be determined and updated upon completion of an access request that is directed toward its corresponding sub range. When the traffic value is updated, it may be incremented or otherwise adjusted based on the request latency of the access request (e.g. access time). As one example, the amount of the adjustment may be proportional to the request latency. The traffic values can be based on request latency and request rate. In doing so, sub ranges that have had higher request rates over a period of time than other sub ranges may still have smaller traffic values than those other sub ranges. This can result from, for example, higher latency in the sub ranges than the other sub ranges over the period of time.

The traffic values may decay over time. For example, the traffic values may have a rate of decay. The traffic values may share a rate of decay or may decay at different rates. In some implementation, the rate of decay is exponential. Decaying the traffic values over time is one approach to contemporizing the tracked traffic across a partition key range. From the foregoing, it should be clear that traffic values can be based on any combination of request rate, request latency, decay over time, and/or other factors.

In some implementations, the traffic values can correspond to buckets. The buckets can be tracked by partition layer 330, for example, utilizing corresponding bucket index values, which can be stored for load balancing. The buckets may be defined by the aforementioned boundaries and each bucket can represent the partition key(s) that correspond to one of the traffic values. In some implementations, each bucket is defined by a pair of boundaries. Buckets can share one or more boundaries with one or more other buckets (e.g. an adjacent bucket), or any of the boundaries can be exclusive to a bucket.

In the example shown, partition key range 400 is divided into buckets that each correspond to sub ranges of partition keys. FIG. 4A shows buckets 442, 444, 446, 448, 450, 452, 454, and 456, by way of example. For example, FIG. 4A shows corresponding sub ranges of partition keys for each of the buckets. Bucket 442 has a sub range from partition key 0 to partition key 10, bucket 444 has a sub range from partition key 10 to partition key 20, and so on.

The buckets in FIG. 4A are each defined by a pair of boundaries. The pair of boundaries defines the sub range that corresponds to a bucket. Depicted are boundaries 460a, 460b, 460c, 460d, 460e, 460f, 460g, 460h, and 460i, which delineate the buckets. Partition key values are shown below their corresponding boundaries. Bucket 442 has boundaries 460a and 460b that define the sub range of partition keys that corresponds to bucket 442, bucket 444 has boundaries 460b and 460c that define the sub range of partition keys that corresponds to bucket 444, and so on.

In the implementation shown, traffic 468 across partition key range 400 is tracked by way of traffic values 462a, 462b, 462c, 462d, 462e, 462f, 462g, and 462h. The traffic values correspond to different sub ranges and buckets of partition key range 400. For example, traffic value 462a corresponds to bucket 442, traffic value 462b corresponds to bucket 444, and so on. A traffic value can correspond to a portion of traffic 468 that is within its corresponding bucket (indicated by arrows). For example, an access request that corresponds to a partition key between the pair of boundaries that defines the bucket can be accounted for in the traffic value.

In FIG. 4A, respective heights of the traffic values shown in FIG. 4A can correspond to the amount of traffic 468 directed towards a respective bucket over time. Therefore, FIG. 4A indicates a substantially even distribution of traffic 468 across partition key range 400 with respect to the buckets and/or sub ranges. However, the heights of the traffic values can differ depending on the distribution of the traffic. For example, if additional traffic is directed toward bucket 442, traffic value 462a may be higher to depict additional traffic metaphorically filling bucket 442.

Partition layer 330 of FIG. 3 can make load balancing decisions based on the tracked distribution of a partition key range. For example, the partition that corresponds to partition key range 400 can be split into multiple partitions to more evenly distribute load across servers of the scalable storage. In some implementations, the load balancing decisions are based on determining one or more references keys in partition key range 400. Reference keys can optionally correspond to split-points in partition key range 400, whereby the corresponding partition of partition key range 400 may be split into multiple partitions based on one or more reference keys. For example, a partition may be split at or substantially at a reference key.

Determining the one or more reference keys can be based on the tracked traffic across partition key range 400, for example, based on the tracked traffic distribution across partition key range 400. The one or more reference keys may be determined based on dividing the tracked traffic by the one or more reference keys across partition key range 400. In some implementations, the one or more reference keys are based on the traffic values. For example, the one or more reference keys can be calculated or otherwise derived from the traffic values.

Also in some implementations, the one or more reference keys are determined by determining one or more sub ranges or bucket(s) based on the traffic values and selecting a partition key that corresponds to the one or more sub ranges or bucket(s). For example, partition layer 330 may determine a sub range (e.g. bucket) for the reference key based on the traffic values and select a partition key that corresponds to the sub range (e.g. bucket) as the reference key. As one example, the reference key may be selected from sampled keys that are maintained within the sub range. In some implementations, the reference key may be selected based on one or more boundaries that define the sub range. For example, a bucket may be determined using the traffic values and the reference key may be selected as one of the boundaries of the bucket.

Also in some implementations, a reference key is calculated from a mid-point of the tracked traffic (e.g. as determined by the traffic values). Partition layer 330 may determine and identify the bucket and/or boundary that is closest to the mid-point and select a reference key based on that bucket and/or boundary. For example, the reference key may be selected as a sample key within that bucket or as the boundary of that bucket.

In the example shown, partition layer 330 has selected a single reference key 466 (although in other implementations, multiple reference key may be selected). Reference key 466 has been selected based on traffic values 462a, 462b, 462c, 462d, 462e, 462f, 462g, and 462h. In particular, reference key 466 has been selected as a sample key in bucket 450 that would most evenly divide the traffic values across partition key range 400 (e.g. the bucket closest to the mid-point of the tracked traffic). Various approaches to determining one or more reference keys have been described above. However, many different approaches can be employed.

As indicated above, the tracked traffic distribution across partition key range 400 can change over time. Referring now to FIG. 4B, FIG. 4B depicts an exemplary partition key range in accordance with implementations of the present disclosure. In particular, the depiction in FIG. 4B can correspond to additional traffic 472 being tracked across partition key range 400. The tracked traffic at the time of the depiction in FIG. 4A can be updated based on additional traffic 472 across partition key range 400. In particular, traffic values 462a, 462b, 462c, 462d, 462e, 462f, 462g, and 462h may be updated traffic values based on the distribution of additional traffic 472. As shown in FIG. 4B, traffic value 462a is largest indicating that additional traffic 472 has been concentrated in bucket 442, with buckets 462g and 462h having received lower amounts of traffic than the other buckets. Reference key 470 may be selected using a common metric as was used to select reference key 466 (i.e. common selection criteria). Unlike reference key 466, reference key 470 is within bucket 448 due to the different tracked traffic distribution. Partition key range 400 may optionally be split at reference key 470.

Determining reference keys is one exemplary approach to determining how to modify a partition for load balancing (e.g. where to split the partition) based on tracked traffic. In addition to or instead of determining how to modify a partition for load balancing, implementations of the present disclosure relate to determining whether or not to modify (e.g. split) the partition for load balancing.

In some implementations, determining whether or not to modify the partition for load balancing is based on one or more reference keys, which may be the same or different than the reference keys described above. In this respect, reference keys can be utilized to track the distribution of the traffic (e.g. traffic 468 and additional traffic 472) across partition key range 400 over time. For example, one or more reference keys can be determined based on a first tracked traffic distribution (e.g. a first arrangement of traffic values, boundaries, and/or buckets) at time t1. At time t2, following time t1, the partition key range can have a second tracked traffic distribution (e.g. a second arrangement of traffic values, boundaries, and/or buckets). The one or more reference keys can be used as a reference point(s) to detect differences or changes between the first and second tracked traffic distributions and load balancing decisions can be made accordingly.

In some implementations, differences or changes in tracked traffic distributions are captured utilizing reference key speed. Reference key speed can correspond to a rate of change in the distribution of tracked traffic with respect to one or more reference keys, such as reference key 466 and/or reference key 470. Reference key speed can be calculated from any number of reference keys, which can correspond to different tracked traffic distributions and may be derived from a common metric. For conciseness of disclosure, reference key speed is described whereby a single reference key is sampled from a given tracked traffic distribution at a given time. However, any number of reference keys may be employed.

As indicated above, the tracked traffic distribution across partition key range 400 can change over time. For example, traffic values may be incremented based on access request patterns on partition keys of partition key range 400. In some implementations, boundaries are adjusted periodically (e.g. every N milliseconds) or at various points over time that may have different tracked traffic distributions. Boundaries can be adjusted to redistribute the tracked traffic (e.g. traffic values) within the boundaries and buckets that are defined by the boundaries. In particular, one or more boundaries can be changed so that one or more sub ranges that correspond to the boundaries and thereby the buckets are also changed.

In some implementations, the boundaries are adjusted so as to more evenly distribute the tracked traffic (e.g. traffic values) within the boundaries across partition key range 400. Adjusting the boundaries can comprise merging different sub ranges (e.g. buckets) into a composite sub range (e.g. a single bucket). For example, adjacent buckets may be merged into a composite or single bucket, whereby the composite or single bucket may be defined by the outer boundaries of the adjacent buckets. The traffic value that corresponds to the composite sub range (or composite or single bucket) may then be a sum of the traffic values of the original sub ranges (or original buckets).

Adjusting the boundaries can also comprise splitting a sub range into multiple sub ranges (e.g. buckets). For example, a bucket can be split into multiple buckets whereby boundaries split the sub range that corresponds to the bucket into multiple sub ranges, each corresponding to one of the multiple buckets. The traffic value that corresponds to one of the multiple sub ranges (or buckets) may then be a portion of the traffic value of the original sub range (or original bucket).

As a given sub range (e.g. bucket) may comprise any number of partition keys, in some implementations, splitting a sub range comprises selecting a partition key for a boundary based on sampled keys of the sub range. For example, each sub range can have corresponding sampled keys. The sampled keys can be stored and maintained over time. For example, the sampled keys can be updated in adjusting the boundaries so that sampled keys correspond to their proper bucket when the sub ranges of those buckets change. The sampled keys can be selected in any suitable manner, and may correspond to previous boundaries, or other previously determined partition keys. In some implementations, splitting a sub range comprises selecting one of the sample keys of a bucket that is closest to the average sample key of the bucket. For example, the sample keys of the bucket can be sorted and the middle key may be selected. The sample key can be selected in other suitable manners. The bucket can then be split at the selected sample key.

Adjusting the boundaries can also comprise moving a boundary between adjacent buckets. For example, adjacent buckets that share a common boundary can have that common boundary moved so as to more evenly distribute the traffic between those buckets. Adjusting the common boundary changes the sub range that corresponds to each bucket. For example, the sub range may be expanded for one bucket to include a portion of the sub range of the other bucket. The other bucket may in turn have its corresponding sub range diminished. In some implementations, the common boundary is adjusted based on sampled keys within the buckets. For example, the common boundary may be moved to one of the sample keys that is within the bucket having its sub range diminished.

In some implementations, a number of the buckets is substantially maintained or controlled over time. For example, partition layer 330 may be configured to cap the number of buckets, keep the number of buckets within a range, keep the number of buckets constant, or otherwise control the number of buckets at any given time (passively or actively). In some implementations, this can be accomplished by pairing a splitting of a bucket with a merging of a bucket, such that the addition of a bucket is accompanies by a subtraction of a bucket.

In some implementations, adjusting the boundaries comprises selecting first and second buckets based on traffic values. For example, partition layer 330 can determine the first bucket having a largest traffic value of a plurality of buckets and the second bucket having a smallest traffic value of the plurality of buckets. The adjusting the boundaries can further be based on comparing a first traffic value of the first bucket to a second traffic value of the second bucket. For example, the adjusting may be performed in response to the comparing. In some implementations the comparing is based on a ratio between the first and second values. For example, the adjusting may be performed where the ratio exceeds a threshold value. In some implementations, the adjusting is performed where the first value (e.g. the largest traffic value) is approximately two or more times greater than the second value (e.g. the smallest traffic value).

Also in some implementations, where the first and second buckets are adjacent, the adjusting the boundaries can comprise moving a boundary between the buckets (e.g. a common boundary that separates the buckets). Where the first and second buckets are not adjacent, the adjusting can comprise splitting the first bucket (e.g. having the largest traffic value) or the second bucket. The split bucket (e.g. the first bucket) may be selected based on having a larger traffic value than the other bucket. Where the first and second buckets are not adjacent, the adjusting can also comprise merging the bucket that was not split (e.g. the second bucket) with another bucket (e.g. a bucket adjacent to the bucket that was not split). For example, the bucket can be merged with an adjacent bucket that has the smallest traffic value of any buckets that may be adjacent to the bucket.

The adjusting the buckets can be performed iteratively, wherein each iteration may more evenly distribute the traffic (e.g. traffic values) within the boundaries if possible. The adjusting may be configured such that absent additional traffic over time, the distribution may reach equilibrium as iterations accumulate, which may correspond to what is shown in FIG. 4A, by way of example.

Referring to FIG. 4C, FIG. 4C depicts an exemplary partition key range in accordance with implementations of the present disclosure. In particular, the depiction in FIG. 4C can correspond to the depiction of FIG. 4B after an adjustment to the boundaries shown in FIG. 4B. The boundaries have been adjusted to more evenly distribute the tracked traffic within the boundaries. Thus, the tracked traffic values shown in FIG. 4C have been updated based on the adjusted boundaries.

As an example of the adjustment of the boundaries between FIGS. 4B and 4C, partition layer 330 may select bucket 442 based on bucket 442 having the largest traffic value of the buckets in FIG. 4B, and select bucket 454 based on bucket 454 having the smallest traffic value of the buckets in FIG. 4B.

Based on buckets 442 and 454 not being adjacent, partition layer 330 may split bucket 442 into buckets 442a and 442b, shown in FIG. 4C. The partition key selected to split bucket 442 has a partition key value of 5, by way of example, and may be a sampled key that was maintained in bucket 442 prior to the split. Buckets 442a and 442b have respective traffic values 474a and 474b, which can correspond to portions of traffic value 462a (e.g. each can be half of traffic value 462a). Also based on buckets 442 and 454 not being adjacent, partition layer 330 may merge bucket 454 with bucket 456 based on bucket 456 having a smallest traffic value of any bucket adjacent to bucket 454. As shown, the composite bucket 454 has traffic value 476, which can correspond to a sum of traffic values 462g and 462h. Had buckets 442 and 454 been adjacent, partition layer 330 may have instead adjusted the common boundary between those buckets.

By adjusting the boundaries of the buckets, the updated tracked traffic is more evenly distributed within the boundaries and buckets. As described above, the boundaries may be adjusted iteratively, which may more evenly distribute the updated tracked traffic from what is shown in FIG. 4C. Each iteration may consider similar factors as described above in selecting which buckets and/or boundaries to adjust. By adjusting the boundaries over time, a reference key speed may be determined by utilizing a reference key to determine changes in the buckets and/or boundaries over time.

Reference key speed can correspond to a distance over time. As can be seen in the depiction in FIG. 4C, reference key 466 is located in the sixth bucket from the left whereas in FIG. 4A, reference key 466 is located in the fifth bucket from the left. This adjustment to the boundaries indicates that additional traffic 472 has been concentrated on partition keys that are lower than reference key 466. A reference key speed may therefore be calculated based on reference key 466 having moved one bucket (i.e. distance) over the time between the tracked traffic distributions depicted in FIGS. 4A and 4C (i.e. time).

Distances are across the partition key range and can be expressed in terms of buckets or boundaries, although other means are contemplated. A distance can correspond to a difference between buckets (e.g. bucket indexes) or boundaries of reference keys. To simplify distance calculations it may be desirable that partition key range 400 has the same number of buckets and/or boundaries for different tracked traffic distributions utilized in determining reference key speed. Also, where a reference key falls within a bucket, a distance calculation may consider this case a half a bucket or some other fraction of a bucket. The distance employed in reference speed calculation can be an absolute value so that reference keys speeds are not dependent on directions of change.

In some implementations, reference key speed is based on a running window of samples (e.g. ten minutes of samples). Each sample may correspond to a reference key and comprise a time stamp corresponding to a time when the sample was taken, as well as an index that indicates the location of the reference key in the tracked traffic distribution when the sample was taken. The reference key speed can be calculated from the running window of samples. This can smooth out short-term fluctuations in reference key speeds. For example, the reference key speed can be based on a moving average of rates of changes of the tracked traffic distribution with respect to a reference key. Furthermore, in some implementations, the reference key speed can be based on multiple reference keys and samples of those reference keys.

A high reference key speed can correspond a distribution of the tracked traffic that is changing quickly. In many cases, it may be undesirable to modify a partition where traffic distributions are changing too quickly. For example, if the partition were to be split into multiple partitions, it may not be guaranteed that future access requests are adequately distributed amongst the multiple partitions. Reference key speeds can therefore form an effective basis for determining whether or not to modify a partition.

In some implementations, the modifying the partition is in response to determining that the reference key speed is not exceeding a threshold value. The partition may not be modified based on the reference key speed exceeding the threshold value. Where the reference key speed is based on buckets per minute (BPM), an exemplary threshold value that may be suitable is approximately 0.5 BPM, although it is noted that other units of distance and time can be employed. Furthermore, the threshold value may be adjusted or otherwise changed as needed (either automatically by partition layer 330 or manually).

Determining whether or not to modify a partition based on reference key speed has been found to be an effective means in preventing unnecessary or excessive modification to partitions of scalable storage. For example, load balancing based on reference key speeds can be resilient to certain traffic patterns that may typically result in excessive modification due to difficulties in their detection. As an example, splitting a partition based on partition key speed may be an effective means to prevent excessive splitting where the partition is subject to highly sequential or semi sequential access patterns across its partition key range. For example, if access requests were sequential from partition key 0 to partition key 80 of partition key range 400, it may be undesirable to split the partition into multiple partitions during the access requests because they may quickly no longer be directed toward at least one of the multiple partitions. By properly setting a threshold value for the reference key speed, excessive splitting may be avoided.

Determinations in whether or not to modify a partition can be based on other factors in addition to reference key speed. For example, other patterns may be identified in the reference keys, which can be factored into load balancing decisions. These additional factors can enhance load balancing for various types of access patterns. As an example, where an access pattern on a partition key range comprises sub patterns, certain sub patterns may dominate the reference key speed, which may be accounted for in the other factors. Each sub pattern may correspond to a different user account or a different process on the same account, as some examples.

By way of example, one sub pattern can be a fast moving sequential pattern across a partition key range, and another can be a slow moving pattern that may only direct access requests to one to a handful of partition keys. These one to a handful of partition keys may be substantially isolated from the fast moving sequential pattern and therefore desirable to split into a separate partition from the remaining partition keys. However, it may be difficult to accomplish such splitting without employing the additional factors. For example, the fast moving sequential pattern may cause the reference key speed to stay above a threshold value for modifying (e.g. splitting) the partition.

In accordance with some implementations, load balancing decisions can also be based on reference key drop-off time. Reference key drop-off time can correspond to the time it takes for a reference key to be substantially outside of a window of traffic (e.g. a window of accessed partition key samples). The partition may be modified (e.g. split) based on the reference key drop-off time exceeding a threshold value.

The reference key drop-off time may be implemented by maintaining samples of partition keys that are accessed over a window of time (e.g. approximately thirty to approximately sixty minutes). Furthermore, a reference key may have samples, as described above, which are taken at intervals, such as approximately every minute, during the window of time. It may be desirable for this interval or sample rate to be higher than one employed in determining reference key speed.

Reference key drop-off time may be determined by analyzing the samples of accessed partition keys with the reference key samples over the window of time. Partition layer 330 may identify the most recent reference key sample that is outside of the accessed partition key samples and calculate the reference key drop-off time based on the identified reference key sample. A reference key may be considered outside of the accessed partition key samples where all or substantially all of the accessed partition key samples are on the same side of the reference key samples on the partition key range. In doing so, time stamps of the identified reference key samples may be employed and compared to time stamps of the accessed partition keys. In some implementations, the reference key may still be considered outside of the accessed partition key samples until a threshold amount of accessed partition key samples are on a same side of the reference key samples. Where the reference key drop-off time exceeds a threshold value, the partition may still be split (e.g. at the identified reference key sample), even where the reference key speed is exceeding its aforementioned threshold value.

Additional Examples

Figure 5:
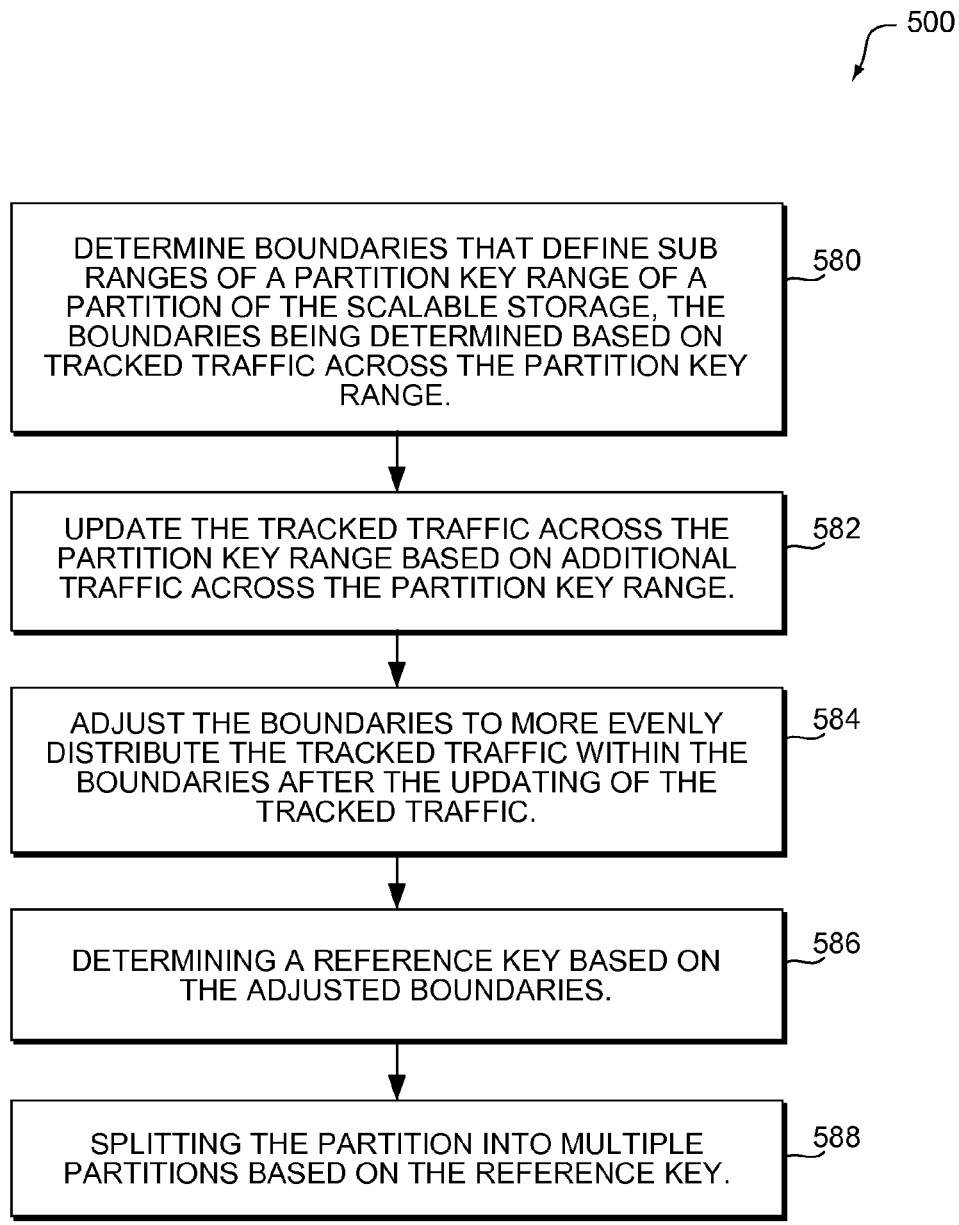
FIG. 5 depicts a flow diagram of an exemplary method for load balancing a scalable storage in accordance with implementations of the present disclosure.

Referring now to FIG. 5, FIG. 5 depicts a flow diagram of an exemplary method (e.g. 500 in FIG. 5) for load balancing a scalable storage in accordance with implementations of the present disclosure. The method comprises: tracking traffic within boundaries that define sub ranges of a partition key range of a partition of the scalable storage (e.g. 580 in FIG. 5), adjusting the boundaries to more evenly distribute the tracked traffic within the boundaries (e.g. 582 in FIG. 5), determining a reference key based on the adjusted boundaries (e.g. 584 in FIG. 5), and splitting the partition into multiple partitions based on the reference key (e.g. 586 in FIG. 5).

Figure 6:
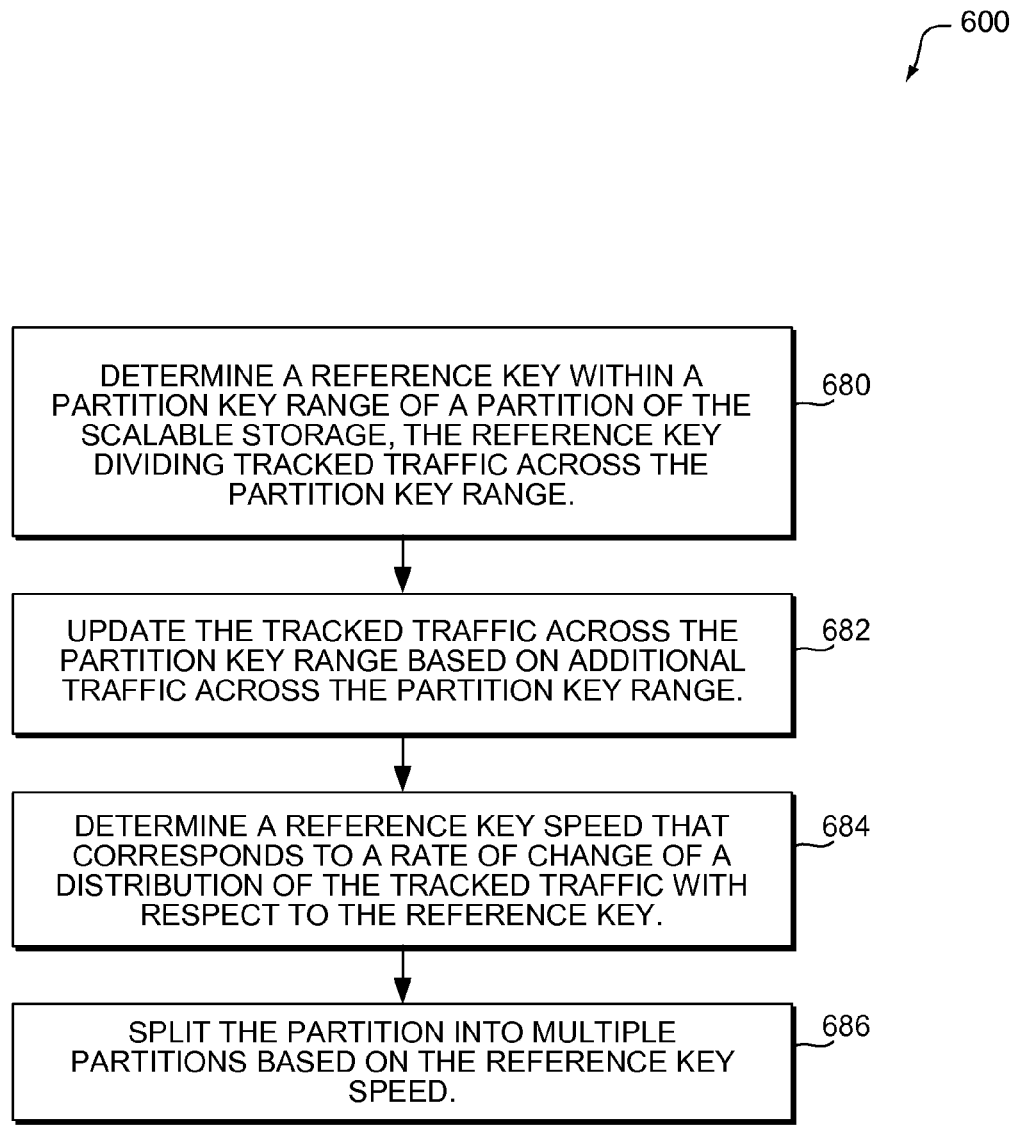
FIG. 6 depicts a flow diagram of an exemplary method for load balancing a scalable storage in accordance with implementations of the present disclosure.

Referring now to FIG. 6, FIG. 6 depicts a flow diagram of an exemplary method (e.g. 600 in FIG. 6) for load balancing a scalable storage in accordance with implementations of the present disclosure. The method comprises: determining a reference key within a partition key range of a partition of the scalable storage, the reference key dividing tracked traffic across the partition key range (e.g. 680 in FIG. 6), updating the tracked traffic across the partition key range based on additional traffic across the partition key range (e.g. 682 in FIG. 6), determining a reference key speed that corresponds to a rate of change of a distribution of the tracked traffic with respect to the reference key (e.g. 684 in FIG. 6), and splitting the partition into multiple partitions based on the reference key speed (e.g. 686 in FIG. 6).

Figure 7:
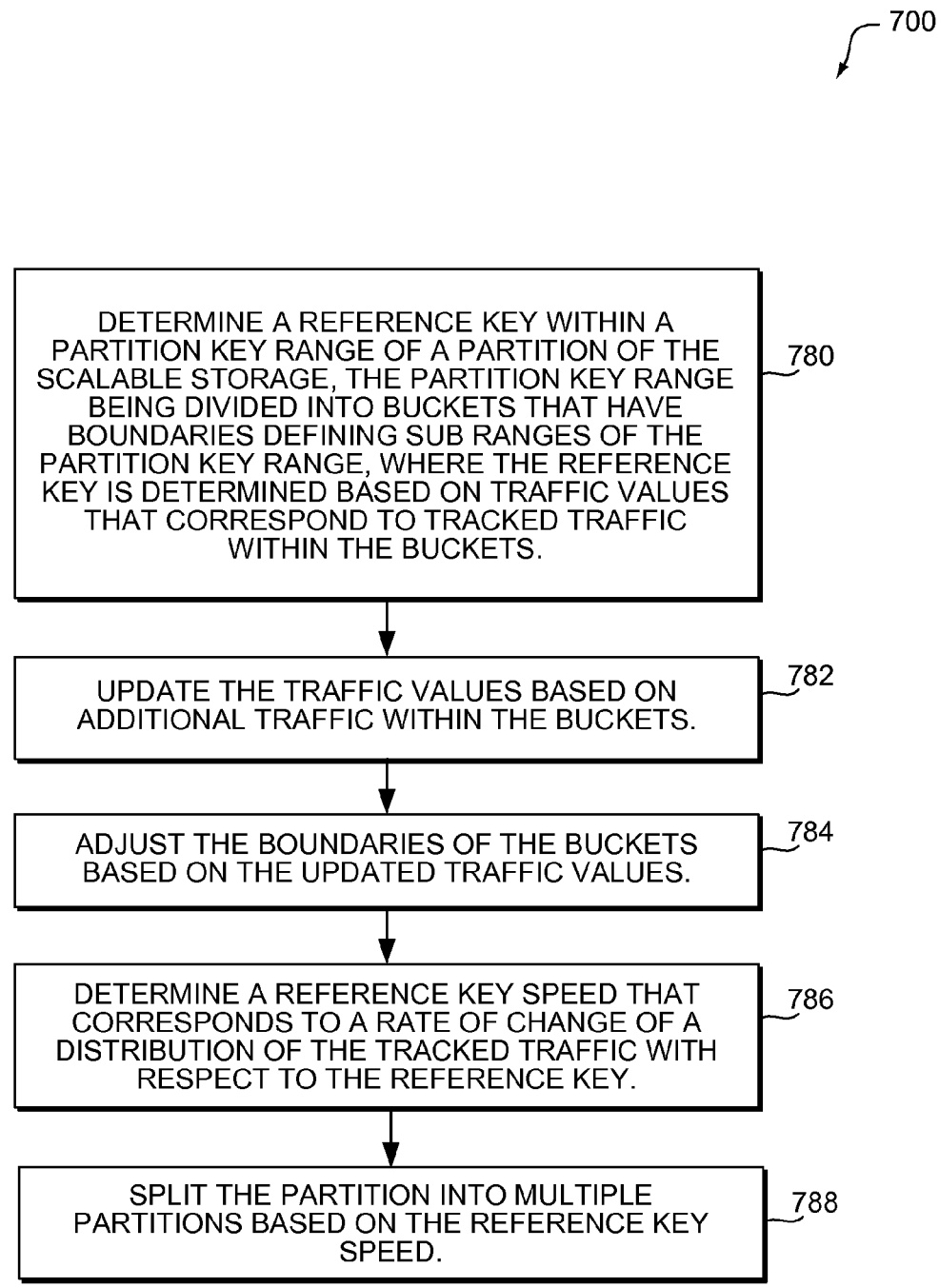
FIG. 7 depicts a flow diagram of an exemplary method for load balancing a scalable storage in accordance with implementations of the present disclosure.

Referring now to FIG. 7, FIG. 7 depicts a flow diagram of an exemplary method (e.g. 700 in FIG. 7) for load balancing a scalable storage in accordance with implementations of the present disclosure. The method comprises: determining a reference key within a partition key range of a partition of the scalable storage, the partition key range being divided into buckets that have boundaries defining sub ranges of the partition key range, where the reference key is determined based on traffic values that correspond to tracked traffic within the buckets (e.g. 780 in FIG. 7), updating the traffic values based on additional traffic within the buckets (e.g. 782 in FIG. 7), adjusting the boundaries of the buckets based on the updated traffic values (e.g. 784 in FIG. 7), determining a reference key speed that corresponds to a rate of change in a distribution of the tracked traffic with respect to the reference key (e.g. 786 in FIG. 7), and splitting the partition into multiple partitions based on the reference key speed (e.g. 788 in FIG. 7).

Thus, in accordance with implementations of the present disclosure, load balancing decisions can be made utilizing any combination of reference keys, reference key speeds, buckets, boundaries, and traffic values. These decisions may comprise whether or not to modify a partition and/or where or how to modify the partition. Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. A computer-implemented method for load balancing a scalable storage, the method comprising:
    determining a reference key within a partition key range of a partition of the scalable storage, the partition key range being divided into buckets that have boundaries defining sub ranges of the partition key range, wherein the reference key is determined based on traffic values that correspond to tracked traffic within the buckets;
    updating the traffic values based on additional traffic within the buckets;
    adjusting the boundaries of the buckets based on the updated traffic values;
    determining a reference key speed that corresponds to a rate of change of a distribution of the tracked traffic with respect to the reference key;
    splitting the partition into multiple partitions based on the reference key speed.

2. The computer-implemented method of claim 1, wherein the adjusting the boundaries of the buckets more evenly distributes the updated traffic values amongst the buckets.

3. The computer-implemented method of claim 1, wherein the determining the reference key is based on identifying one of the buckets that is closest to a mid-point of the traffic values prior to the updating of the traffic values.

4. The computer-implemented method of claim 1, wherein the splitting the partition into multiple partitions is in response determining that the reference key speed is not exceeding a threshold value.

5. The computer-implemented method of claim 1, wherein the adjusting the boundaries comprises merging at least some of the buckets into a single bucket.

6. The computer-implemented method of claim 1, wherein the adjusting the boundaries comprises splitting at least one of the buckets into multiple buckets.

7. The computer-implemented method of claim 1, wherein the adjusting the boundaries comprises moving a common boundary between adjacent buckets.

8. The computer-implemented method of claim 1, wherein the traffic values are based on request latency of access requests on the partition.

9. The computer-implemented method of claim 1, wherein the splitting the partition into multiple partitions is further based on a reference key drop-off time.

10. A computer-implemented method for load balancing a scalable storage, the method comprising:
    determining a reference key within a partition key range of a partition of the scalable storage, the reference key dividing tracked traffic across the partition key range;
    updating the tracked traffic across the partition key range based on additional traffic across the partition key range;
    determining a reference key speed that corresponds to a rate of change of a distribution of the tracked traffic with respect to the reference key;
    splitting the partition into multiple partitions based on the reference key speed.

11. The computer-implemented method of claim 10, wherein the rate of change of the distribution of the tracked traffic is based on a change between the tracked traffic and the updated tracked traffic.

12. The computer-implemented method of claim 10, wherein the reference key speed is based on a running window of samples.

13. The computer-implemented method of claim 10, wherein the splitting the partition results in the one of the multiple partitions being assigned to a first server of the scalable storage and another of the multiple partitions being assigned to a second server of the scalable storage.

14. The computer-implemented method of claim 10, wherein the reference key speed is based on a first time stamp of a first sample of the reference key and a second time stamp of a second sample of the reference key.

15. One or more computer-storage media storing computer-useable instructions that, when executed by a computing device, perform a method for load balancing a scalable storage, the method comprising:
    tracking traffic within boundaries that define sub ranges of a partition key range of a partition of the scalable storage;
    adjusting the boundaries to more evenly distribute the tracked traffic within the boundaries;
    determining a reference key based on the adjusted boundaries;
    splitting the partition into multiple partitions based on the reference key.

16. The one or more computer-storage media of claim 15, wherein the splitting the partition into multiple partitions is at a split-point that is based on the reference key.

17. The one or more computer-storage media of claim 15, wherein the determining the reference key based on the adjusted boundaries comprises identifying one of the sub ranges that is closest to the mid-point of the tracked traffic.

18. The one or more computer-storage media of claim 15, wherein the adjusting the boundaries comprises merging adjacent ones of the sub ranges into a composite sub range that is defined by the adjusted boundaries.

19. The one or more computer-storage media of claim 15, wherein the splitting the partition into multiple partitions is further based on determining a time it takes for a reference key to be outside of a window of traffic.

20. The one or more computer-storage media of claim 15, comprising maintaining sample keys within the sub ranges, wherein in the adjusting the boundaries, at least one of the boundaries is adjusted to one of the sample keys.

* * * * *